United States Patent
Matsuura et al.

(10) Patent No.: US 6,284,304 B1
(45) Date of Patent: Sep. 4, 2001

(54) PROCESS FOR PRODUCING TOFU

(75) Inventors: Masaru Matsuura; Yoshiro Yamanaka; Shigeru Noguchi; Jun Sasaki; Tomoko Takeuchi, all of Chiba Pref. (JP)

(73) Assignee: Kikkoman Corporation, Chiba pref (JP)

( * ) Notice: Subject to any disclaimer, the term of this patent is extended or adjusted under 35 U.S.C. 154(b) by 0 days.

(21) Appl. No.: 09/449,759

(22) Filed: Nov. 26, 1999

(30) Foreign Application Priority Data

Dec. 7, 1998 (JP) ................................. 10-346311

(51) Int. Cl.$^7$ ....................................... A23L 1/20
(52) U.S. Cl. .................. 426/634; 426/573; 426/397; 426/402
(58) Field of Search .................... 426/634, 573, 426/397, 402

(56) References Cited

U.S. PATENT DOCUMENTS

| | | | |
|---|---|---|---|
| 4,636,398 | * | 1/1987 | Matsuura .............................. 426/634 |
| 4,645,681 | * | 2/1987 | Sugisawa et al. .................... 426/634 |
| 4,664,930 | * | 5/1987 | Moriya ................................. 426/634 |
| 4,678,677 | * | 7/1987 | Sugisawa et al. .................... 426/634 |
| 4,732,774 | * | 3/1988 | Sugisawa et al. .................... 426/634 |
| 4,789,556 | * | 12/1988 | Okonogi et al. ...................... 426/634 |
| 4,791,001 | * | 12/1988 | Matsuura et al. .................... 426/634 |
| 4,826,701 | * | 5/1989 | Joo et al. ............................. 426/634 |
| 5,183,681 | * | 2/1993 | Okamoto et al. .................... 426/634 |
| 5,190,787 | * | 3/1993 | Takeoka et al. ..................... 426/634 |
| 5,863,590 | * | 1/1999 | Alan et al. ........................... 426/634 |
| 6,004,613 | * | 12/1999 | Amano et al. ....................... 426/634 |
| 6,042,851 | * | 3/2000 | Matsuura et al. .................... 426/634 |

FOREIGN PATENT DOCUMENTS

| | | | |
|---|---|---|---|
| 58-51865 | | 3/1983 | (JP) . |
| 60-118159 | * | 6/1985 | (JP) .................................... 426/634 |
| 61-289850 | * | 12/1986 | (JP) .................................... 426/634 |
| 2-295453 | | 12/1990 | (JP) . |
| 2-312564 | | 12/1990 | (JP) . |
| 9-322731 | | 12/1997 | (JP) . |

* cited by examiner

*Primary Examiner*—Steven Weinstein
(74) *Attorney, Agent, or Firm*—Young & Thompson

(57) ABSTRACT

The soybean milk containing a coagulant is primarily heated, packed into a molding container, and secondarily heated to complete coagulation. And, (1) the coagulated product (silken tofu) is transferred into a container for distribution, alternatively, (2) the coagulated product (silken tofu) is collapsed, and transferred into a draining container made of porous boards and pressed from the upper side to drain part of the water content, and the resulting momen tofu is transferred from the draining container into a container for distribution. Then, water is added to the container for distribution so as to allow the silken tofu or the momen tofu to sink under the water, followed by sealing.

4 Claims, 1 Drawing Sheet

PROCESS FOR PRODUCING TOFU

BACKGROUND OF THE INVENTION

1. Field of the Invention

The present invention relates to a novel process for producing tofu (bean curd).

2. Description of the Related Art

Tofu is roughly divided into two types, momen (pressed) tofu and silken tofu. In a traditional manner, both momen tofu and silken tofu are prepared by pouring hot soybean milk just squeezed out into a mold, mixing natural coagulants such as $MgCl_2$ and $CaCl_2$ into the soybean milk and stirring, and allowing the mixture to stand to completely coagulate. In preparing momen tofu, the coagulated product in the mold is transferred into a wooden draining frame with cloth lying therein, then pressed to drain part of contained water and shaped. The resulting tofu is then cut to size and immersed in water. In preparing silken tofu, coagulation is completed within the mold, and the resulting tofu is cut to size and immersed in water.

A traditional manner for preparing tofu ensures stable coagulation by conducting coagulating operation on ten to tens pieces scale.

In recent years, the production of tofu is on the trend of large scale and mechanization. Even in this case, however, tofu is actually produced in a method which follows the traditional production method as closely as possible.

On the other hand, there have been proposed a method for dehydrating and forming coagulated soybean milk in a production device of tofu which has been practiced in both momen and silken tofu preparations (see Japanese Laid-open Patent No. 2-295453 and No. 2-312564). This method draws attention from the standpoint of practicability for mass production, convenience in distribution, hygiene, and so forth. The preparation adopted in this system is to fill a mold with cold soybean milk containing a coagulant and then to heat it.

In the meantime, the structure of tofu consists of net structure between soybean proteins formed by coagulation. The study of the inventors have revealed that the taste of tofu depends on whether the net structure is uniform or non-uniform. While the structure of tofu varies according to the raw soybeans, the method for preparing soybean milk, the protein concentration of soybean milk, the kind and amount of the coagulant and the like, in tofu prepared in the traditional method, a coagulant is added to hot soybean milk, so that coagulating reaction starts immediately after the addition of a coagulant to thereby form non-uniform tofu structure.

On the other hand, in the mass production method taught by the prior art publications mentioned above, the soybean milk is cooled enough to suppress coagulating reaction from mixing natural coagulants to filling it into a mold as much as possible, and then the soybean milk thus filled in the mold is heated so that coagulating reaction proceeds. Accordingly, the structure of the resultant tofu is uniform, and the texture of silken and that of momen tofu formed from collapsed silken tofu as well do not match the texture of traditional tofu. That is, the collapsing-in-the-mouth texture of tofu as given by traditional tofu makes tofu really tasty, but unfortunately the machine production fails to produce such tasty tofu.

While the texture is influenced by such conditions as the method for preparing soybean milk, the protein concentration, the kind of the coagulant, and the like as mentioned above, it is extremely difficult to vary the texture quality of tofu simply by somewhat altering these conditions.

SUMMARY OF THE INVENTION

Therefore, the object of the present invention is to provide a process for producing tofu, even in a mass production method, having the texture comparable to the texture of tofu produced in the traditional method.

As a result of the intensive studies, the present inventors have found that the problems can be solved by adopting a two-stage heating step, in which cold soybean milk to which a coagulant has been added is heated primarily before being packed into a container, and the primarily heated soybean milk is packed into a container and then heated secondarily to complete coagulation. In addition, the present inventors have found that varying the primary heating condition results in a variety texture of tofu, and the present invention has been completed by these findings.

According to the process of the present invention, even if it is applied to a mass production method by machine, tofu having such desirable texture as that of tofu produced in the traditional method can be obtained.

This seems to be because-soybean milk, when heated in a conventional single stage, coagulates slowly and uniformly as a whole to give a uniform texture, whereas the two-stage heating makes the tofu structure non-uniform to give a complicated texture, which will be manifested as a delicate difference in palatability. Where the secondary heating is performed in plural stages, it is possible to make tofu texture more delicate.

DETAILED DESCRIPTION OF THE INVENTION

Figure 1:
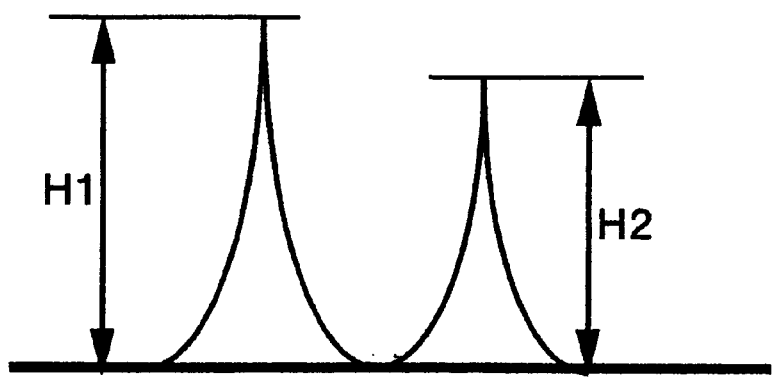
FIG. 1 is a diagram illustrating cohesiveness of tofu.

The present invention will be specifically explained hereinafter.

Soybean milk used as a starting material is prepared in a conventional manner. That is, soaked soybeans, skinned soybeans or unsoaked soybeans are ground in a grinder together with water, and the resulting slurry is heated at 85 to 120° C. for about 0.1 to 10 minutes, followed by filtration to obtain soybean milk.

Although most of the microorganisms in soybeans are killed by the heat treatment, the presence of heat-resistant soil bacteria or heat-resistant soil endospores which have originated from the soil attached to soybeans is expected. Therefore, the soybean milk can be subjected to ultra high temperature (UHT) treatment at 130 to 160° C. for 1 to 20 seconds to prepare sterile soybean milk. The protein concentration of soybean milk is 2 to 10% by weight, preferably 3 to 8% by weight. If desired, the protein concentration of soybean milk can be adjusted by addition of isolated soybean protein.

The soybean milk thus prepared is cooled to 2 to 15° C., preferably 5 to 10° C., and a coagulant is added thereto. A coagulant can be added in a conventional manner, for example, adding into a soybean milk storing tank, or continuously pouring into a soybean milk transmitting pipe.

Coagulants which can be used include a natural coagulant, magnesium chloride, magnesium sulfate, calcium chloride, calcium sulfate, calcium primary phosphate, calcium lactate, and gluconodeltalactone or transglutaminase.

One or more than one of them are added to soybean milk in an appropriate concentration.

The soybean milk to which the coagulant has been added is heated primarily. The heating temperature ranges from 20 to 50° C. If the heating temperature is too high, coagulation will proceed before the soybean milk is packed into a container, which makes it difficult to pack the soybean milk into a container and also resulting in deterioration of quality. Further, it should be noted that coagulation proceeds if heating is continued for too long a time at an elevated temperature. Whatever heating conditions may be, the primary heating must be ceased before coagulation takes place.

The primary heating is carried out in an indirect heating system using a plate heater, a tubular heater, etc. with a heating medium such as steam and hot water. The texture of finally obtained tofu can be selected freely by changing (1) the primary heating temperature by changing the temperature of the heating medium such as steam or hot water, (2) controlling the retention time of the soybean milk in a tubular heater or (3) changing the mixed state during the heating.

Immediately after the primary heating, the soybean milk is packed into a mold and then subjected to secondary heating at 55 to 110° C. for 5 to 120 minutes to complete coagulation, followed by cooling.

Where the secondary heating at 55° C. or higher is performed in plural stages, it is possible to reduce the time required for coagulation and also to make a further variation in tofu texture.

For example, variety can be added to the texture by heating at 55 to 70° C. for 10 to 30 minutes and then at 75 to 90° C. for 10 to 30 minutes.

After coagulation has been completed by the secondary heating, tofu is cut into appropriate sizes, if necessary. The tofu is then transferred into a container for distribution and sealed to give a tofu product (silken tofu). Otherwise, after coagulation has been completed, the coagulated product is collapsed and transferred to a draining container made of porous boards, and then pressurized from the upper side to drain part of the water content. The resulting tofu is cut into appropriated sizes, if necessary, and transferred into a container for distribution and sealed to give a tofu product (momen tofu).

In either case, the container for distribution is filled with clean water enough to allow the tofu to sink under the water, which is preferable because the tofu is kept leached in water during the distribution.

The present invention will now be illustrated in greater detail with reference to Examples.

EXAMPLE 1

Whole soybeans (100 kg) were washed with water, soaked in water overnight, and ground in a horizontal grinder while pouring 400 l of water. Immediately after grinding, the resulting slurry was heated in a heater provided in the discharge pipe of the grinder to 105° C. After heating for 30 seconds and then cooling to 80° C., the solid matter was separated by means of a screw decanter to give soybean milk.

The resulting soybean milk was degassed in a vacuum chamber (degree of vacuum: 500 mmHg), followed by cooling to 10° C. To the cooled soybean milk were added magnesium chloride and calcium chloride in concentrations of 0.25% and 0.05%, respectively. The soybean milk had a protein concentration of 6.5%.

The soybean milk containing the coagulant was primarily heated at 25° C. for 20 seconds and packed into a plastic container (11×11×3 cm). Immediately thereafter, the soybean milk was heated in a steam chamber set at 80° C. for 50 minutes to coagulate. The coagulated product was taken from the container to obtain silken tofu. The tofu was transferred into a plastic container for distribution (11.5× 11.5×3.5 cm), clean water was put into the container so as to allow the tofu to sink under the water in the container, and the container was completely sealed with a plastic sheet. The container and the contents were cooled to 10° C. in a cooling tank. The primary heating was carried out by means of double wall tubular heater equipped with a static stirrer. The heating temperature was the temperature of the soybean milk at the time of packing into the container, and the heating time was the retention time in the tubular heater.

The samples were kept at 5° C. overnight, and the hardness and cohesiveness of the tofu sample was measured by Tensipresser manufactured by Taketomo Electric Inc. The palatability of tofu was organoleptically tested by 20 panelists and evaluated by the number of the panelists who judged palatable. Comparative tofu was prepared in the same manner as described above, except that the primary heating was not carried out. The obtained results are shown in Table 1.

TABLE 1

| Sample | Primary Heating Conditions | | Measurement with Tensipresser | | Organoleptic Test Number of panelists |
|---|---|---|---|---|---|
| | Temp. (° C.) | Time (sec) | Hardness (×10$^6$ erg/cm$^2$) | Cohesiveness (H2/H1) | who judged palatable |
| Invention | 25 | 20 | 8.84 | 0.78 | 18 |
| Comparison | — | — | 7.95 | 0.90 | 2 |

Method of Hardness Measurement:

Five 17-mm cubes were cut out of each sample, and the cube was pressed with a disc plunger (diameter: 40 mm) in Tensipresser (manufactured by Taketomo Electric Inc.) The average of total stress until rupture (erg/cm$^2$) (n=5) was taken as the hardness of tofu.

Method of Measuring Cohesiveness:

17-mm cubes werre cut out of each sample, and the cube was pressed twice with a disc plunger (diameter: 40 mm) to a height of 9 mm to obtain the respective stress patterns. A ratio of the peak height (H2) of the second stress pattern to the peak height (H1) of the first stress pattern, H2/H1, was taken as an indication of cohesiveness (see FIG. 1). It can be said that as the H2/H1 ratio approaches 1.0, the tofu structure becomes more uniform, and as the ratio gets apart from 1.0, the structure becomes less uniform.

As is apparent from Table 1, the silken tofu prepared by the process of the present invention is different from the comparative tofu in hardness and cohesiveness. The difference in cohesiveness exerts a delicate influence on the palatability, which is considered to be manifested in the results of the organoleptic test.

EXAMPLE 2

Whole soybeans (300 kg) were washed with water, soaked in water overnight, and ground in a horizontal grinder at a low temperature while pouring 1400 l of water of 5° C. Immediately after grinding, the resulting slurry was preliminarily heated in a double wall tubular heater provided in the discharge pipe of the grinder, heated to 105° C. by a steam injection heater fitted to the same double wall tube. After keeping for 30 seconds and cooling to 90° C., the solid matter was separated by means of a screw decanter to obtain soybean milk. The resulting soybean milk was degassed in a vacuum container (degree of vacuum: 65 mmHg), followed by cooling to 10° C. The protein concentration of the soybean milk was 5.5%.

To the cooled soybean milk (10° C.) were added a 50% aqueous solution of magnesium chloride ($MgCl_2 \cdot 6H_2O$) and a 50% aqueous solution of calcium chloride ($CaCl_2 \cdot 2H_2O$) in amounts of 5 ml and 1 ml, respectively, per liter of the soybean milk. The mixture was primarily heated in a tubular heater and packed into a 600 ml-volume plastic container. The temperature of the soybean milk at the packing was 30° C., and the heating time (the retention time in the tubular heater) was 15 seconds.

Immediately after the packing, the mixture was completely coagulated by secondary heating with steam at 90° C. for 60 minutes. The coagulated product was once collapsed, transferred into a draining container made of porous boards and pressed from the upper side for 30 minutes to remove 190 ml of water. The thus shaped tofu weighing about 400 g was taken out of the container and transferred into a plastic container for distribution. Clean water was put into the container so as to allow the tofu to sink under the water in the container, and the container was sealed and cooled to 10° C. in a cooling bath. The resulting product had a hardness of $1 \times 10^7$ erg/cm$^2$.

What is claimed is:

1. A process for producing tofu comprising the steps of
   (a) cooling soybean milk to a temperature of 2 to 15° C.,
   (b) adding coagulant to the cooled soybean milk,
   (c) heating the soybean milk with added coagulant to a temperature of 20 to 50° C. but stopping this heating before coagulation takes place,
   (d) filling the soybean milk into a mold,
   (e) further heating the soybean milk in the mold to 55 to 110° C. for 5 to 120 minutes to coagulate the soybean milk,
   (f) taking the coagulated product from the mold and transferring the resulting tofu into a container for distribution, and
   (g) adding water into the container so as to allow the tofu to sink under the water, followed by sealing.

2. A process as claimed in claim 1, wherein said soybean milk is cooled to 5 to 10° C. before the coagulant is added thereto.

3. A process for producing tofu comprising the steps of
   (i) cooling soybean milk to a temperature of 2 to 15° C.,
   (ii) adding coagulant to the cooled soybean milk,
   (iii) heating the soybean milk with added coagulant to a temperature of 20 to 50° C. but stopping this heating before coagulation takes place,
   (iv) filling the soybean milk into a mold,
   (v) further heating the soybean milk in the mold to 55 to 110° C. for 5 to 20 minutes to coagulate the soybean milk,
   (vi) collapsing the coagulated product, transferring the collapsed mass into a draining container made of porous boards, and pressing the mass from the upper side to drain part of the water content,
   (vii) taking the resulting tofu from the draining container and transferring the tofu into a container for distribution, and
   (viii) adding water into the container so as to allow the tofu to sink under the water, followed by sealing.

4. A process as claimed in claim 3, wherein said soybean milk is cooled to 5 to 10° C. before the coagulant is added thereto.

* * * * *